United States Patent
Yuki et al.

(10) Patent No.: US 11,919,472 B2
(45) Date of Patent: Mar. 5, 2024

(54) SIDE AIRBAG AND SIDE AIRBAG DEVICE

(71) Applicant: JOYSON SAFETY SYSTEMS JAPAN K.K., Tokyo (JP)

(72) Inventors: Tatsuya Yuki, Shiga (JP); Masatoshi Yokota, Shiga (JP)

(73) Assignee: Joyson Safety Systems Japan G.K. (JP)

( * ) Notice: Subject to any disclaimer, the term of this patent is extended or adjusted under 35 U.S.C. 154(b) by 39 days.

(21) Appl. No.: 17/775,883

(22) PCT Filed: Oct. 22, 2020

(86) PCT No.: PCT/JP2020/039695
§ 371 (c)(1),
(2) Date: May 10, 2022

(87) PCT Pub. No.: WO2021/100401
PCT Pub. Date: May 27, 2021

(65) Prior Publication Data
US 2022/0388471 A1 Dec. 8, 2022

(30) Foreign Application Priority Data
Nov. 22, 2019 (JP) .................................. 2019-211467

(51) Int. Cl.
*B60R 21/233* (2006.01)
*B60R 21/207* (2006.01)
(Continued)

(52) U.S. Cl.
CPC ...... *B60R 21/233* (2013.01); *B60R 21/23138* (2013.01); *B60R 21/235* (2013.01);
(Continued)

(58) Field of Classification Search
CPC ............ B60R 21/233; B60R 21/23138; B60R 21/207; B60R 2021/23324
See application file for complete search history.

(56) References Cited

U.S. PATENT DOCUMENTS 7,431,332 B2 * 10/2008 Wipasuramonton ......................... B60R 21/23138
280/730.2
8,348,305 B2 * 1/2013 Naruse .................. B60R 21/235
280/730.2

(Continued)

FOREIGN PATENT DOCUMENTS

| JP | 2005-053465 A | 3/2005 |
| JP | 2005-119510 A | 5/2005 |

(Continued)

OTHER PUBLICATIONS

International Searching Authority, "International Search Report," issued in connection with International Patent Application No. PCT/JP2020/039695, dated Dec. 8, 2020.

(Continued)

*Primary Examiner* — Paul N Dickson
*Assistant Examiner* — Tiffany L Webb
(74) *Attorney, Agent, or Firm* — Foley & Lardner LLP (57) ABSTRACT

A side airbag that is to be inflated and deployed to a side of an occupant, includes: a first chamber that is positioned in an upper portion and is to be inflated to a side of a shoulder part of the occupant; and a second chamber that is on a lower side of the first chamber, and a thickness regulating member for reducing an inflation thickness is provided at an upper portion of a front portion of the second chamber.

12 Claims, 12 Drawing Sheets

(51) Int. Cl.
  *B60R 21/231* (2011.01)
  *B60R 21/235* (2006.01)
(52) U.S. Cl.
  CPC ... *B60R 21/207* (2013.01); *B60R 2021/23324* (2013.01); *B60R 2021/23538* (2013.01)

(56) References Cited

U.S. PATENT DOCUMENTS

| | | | |
|---|---|---|---|
| 8,562,015 B2* | 10/2013 | Yamamoto | B60R 21/2346 280/730.2 |
| 8,757,657 B1 | 6/2014 | Hotta et al. | |
| 9,505,369 B2* | 11/2016 | Iida | B60R 21/239 |
| 9,682,681 B1 | 6/2017 | Patel et al. | |
| 10,640,073 B2* | 5/2020 | Nukaya | B60R 21/23138 |
| 2004/0188989 A1 | 9/2004 | Kanto et al. | |
| 2008/0174093 A1* | 7/2008 | Inoue | B60R 21/23138 280/730.2 |
| 2010/0078919 A1 | 4/2010 | Naruse et al. | |
| 2010/0295277 A1 | 11/2010 | Ochiai et al. | |
| 2011/0012330 A1* | 1/2011 | Sato | B60R 21/23138 280/730.2 |
| 2013/0033022 A1 | 2/2013 | Yamamoto | |
| 2014/0239618 A1 | 8/2014 | Katsumata | |
| 2015/0021884 A1 | 1/2015 | Hiraiwa et al. | |
| 2015/0021887 A1 | 1/2015 | Hiraiwa et al. | |
| 2015/0076803 A1 | 3/2015 | Fujiwara | |
| 2015/0137493 A1 | 5/2015 | Fujiwara | |
| 2015/0197212 A1 | 7/2015 | Fujiwara | |
| 2015/0239423 A1 | 8/2015 | Hayashi et al. | |
| 2015/0246656 A1 | 9/2015 | Fujiwara | |
| 2015/0336533 A1* | 11/2015 | Haenel | B60R 21/26005 280/730.2 |
| 2015/0367806 A1* | 12/2015 | Fujiwara | B60R 21/233 280/729 |
| 2017/0088089 A1 | 3/2017 | Mizuno et al. | |
| 2018/0222435 A1 | 8/2018 | Fukawatase et al. | |
| 2019/0084516 A1 | 3/2019 | Fukawatase et al. | |

FOREIGN PATENT DOCUMENTS

| | | |
|---|---|---|
| JP | 2010-105652 A | 5/2010 |
| JP | 2011-001051 A | 1/2011 |
| JP | 2011-020502 A | 2/2011 |
| JP | 2012-066771 A | 4/2012 |
| JP | 2014-028545 A | 2/2014 |
| JP | 2014-046905 A | 3/2014 |
| JP | 2014-073738 A | 4/2014 |
| JP | 2014073738 A * | 4/2014 |
| JP | 2014-080169 A | 5/2014 |
| JP | 2014-133462 A | 7/2014 |
| JP | 2014-136452 A | 7/2014 |
| JP | 2014-141159 A | 8/2014 |
| JP | 2014-156233 A | 8/2014 |
| JP | 2014-159265 A | 9/2014 |
| JP | 2014-162390 A | 9/2014 |
| JP | 2015-020569 A | 2/2015 |
| JP | 2015-020614 A | 2/2015 |
| JP | 2015-058791 A | 3/2015 |
| JP | 2015-096396 A | 5/2015 |
| JP | 5835484 B2 | 12/2015 |
| JP | 2017-065483 A | 4/2017 |
| JP | 2018-122812 A | 8/2018 |
| JP | 2018-161925 A | 10/2018 |
| JP | 2019-055660 A | 4/2019 |
| WO | WO-2011/132316 A1 | 10/2011 |
| WO | WO-2013/183130 A1 | 12/2013 |

OTHER PUBLICATIONS

International Searching Authority, "Written Opinion," issued in connection with International Patent Application No. PCT/JP2020/039695, dated Dec. 8, 2020.

\* cited by examiner

SIDE AIRBAG AND SIDE AIRBAG DEVICE

CROSS-REFERENCE TO RELATED APPLICATIONS

The present application claims priority under 37 U.S.C. § 371 to International Patent Application No. PCT/JP2020/039695, filed Oct. 22, 2020, which claims priority to and the benefit of Japanese Patent Application No. 2019-211467, filed on Nov. 22, 2019. The contents of these applications are hereby incorporated by reference in their entireties.

TECHNICAL FIELD

The present invention relates to a side airbag and a side airbag device that are to be inflated and deployed to a side of a vehicle occupant.

BACKGROUND ART

As a side airbag that is to be inflated and deployed to a side of an occupant at the time of a side collision or the like of a vehicle such as an automobile, Patent Document 1 discloses a side airbag device that is to be inflated and deployed to cover an occupant from a shoulder part to a waist part thereof. An inside of the side airbag of Patent Document 1 is partitioned into a plurality of chambers by a partition portion. An upper chamber of the side airbag restrains the shoulder part of the occupant, and a lower chamber restrains the waist part of the occupant. In addition, a chamber on a front side of a middle portion in an up-down direction restrains a chest part and a belly part.

Patent Document 2 discloses a side airbag configured to regulate (reduce) a thickness of a portion corresponding to an elbow of an occupant.

PRIOR ART DOCUMENT

Patent Document

Patent Document 1: JP-A-2014-141159
Patent Document 2: JP A-2005-53465

SUMMARY OF INVENTION

Problem to be Solved by the Invention

An object of the present invention is to provide a side airbag having, in an upper portion thereof, a first chamber that restrains a shoulder part of an occupant, and suppressing an input load of the airbag that is applied to an upper arm part of the occupant, and a side airbag device that includes the side airbag.

Means for Solving the Problem

A side airbag of the present invention is a side airbag that is to be inflated and deployed to a side of an occupant, the side airbag including: a first chamber that is positioned in an upper portion and is to be inflated to a side of a shoulder part of the occupant; and a second chamber that is on a lower side of the first chamber, in which a thickness regulating member for reducing an inflation thickness is provided at an upper portion of a front portion of the second chamber.

In one aspect of the present invention, the thickness regulating member is constituted by a thickness regulating panel that extends downward toward a front side.

In one aspect of the present invention, a plurality of the thickness regulating panels are provided substantially in parallel.

In one aspect of the present invention, the thickness regulating panel on a rear side has a longer length in a longitudinal direction than the thickness regulating panel on a front side thereof.

In one aspect of the present invention, the thickness regulating panel on a rear side has a larger width in a thickness direction of the side airbag than the thickness regulating panel on a front side thereof.

In one aspect of the present invention, a front edge of the thickness regulating panel is separated from a front edge of the side airbag in an inflation completion state of the side airbag.

In one aspect of the present invention, a vent hole is provided in a front portion of the second chamber, and a front end of at least one of the thickness regulating panel is positioned in a vicinity of the vent hole.

In one aspect of the present invention, the side airbag includes an upper chamber as the first chamber provided in the upper portion, a lower chamber that is provided in a lower portion, a middle chamber that is between the upper chamber and the lower chamber, and an inflator installation chamber that is positioned on a rear side in the middle chamber and communicates with the upper chamber and the lower chamber, respectively.

In one aspect of the present invention, the side airbag includes a first partition panel that partitions the upper chamber from the middle chamber, a second partition panel that partitions the lower chamber from the middle chamber, a first opening that is provided in the first partition panel and through which the upper chamber and the middle chamber communicate with each other, and a second opening that is provided in the second partition panel and through which the lower chamber and the middle chamber communicate with each other.

In one aspect of the present invention, the side airbag further includes a third partition panel that partitions the middle chamber from the inflator installation chamber, in which the first partition panel is joined to the third partition panel and the second partition panel is joined to the third partition panel.

In one aspect of the present invention, the first partition panel extends from a front edge to a rear edge of the side airbag, a rear portion of the first partition panel is sewn to an upper edge of the third partition panel, the second partition panel extends from a front edge to a rear edge of the side airbag, and a rear portion of the second partition panel is sewn to a lower edge of the third partition panel.

A side airbag device of the present invention includes a side airbag of the present invention and an inflator that inflates the side airbag.

Effects of Invention

When the side airbag of the present invention is inflated, the first chamber restrains a shoulder part of an occupant. Since the thickness of the upper portion of the front portion of the second chamber on a lower side of the first chamber is reduced by the thickness regulating member, an input load of the airbag applied to an upper arm part of the occupant is suppressed.

EMBODIMENTS FOR CARRYING OUT THE INVENTION

Hereinafter, an embodiment of the present invention will be described with reference to the drawings. In the following embodiment, front-rear, up-down, and left-right directions coincide with front-rear, up-down, and left-right directions of a vehicle unless otherwise specified. FR, UP, and CENTER in the drawings respectively indicate a front direction, an upper direction, and a center side in a vehicle width direction of the vehicle.

FIGS. 1 to 7 schematically illustrate an inflated state of a side airbag 1 according to an embodiment of the present invention, and FIGS. 8 to 17 are views for illustrating a method of manufacturing the side airbag.

A side airbag device according to the present embodiment is to be mounted on a vehicle body side surface member side of a vehicle seat such as a door. In the present embodiment, the seat is a right side seat of an automobile, and the airbag device is mounted on a right side portion of the seat.

The seat includes a seat cushion, a seatback, and a headrest. The seatback includes a seatback frame serving as a framework of the seatback.

In the present embodiment, the airbag device is attached to the seatback frame.

Figure 1:
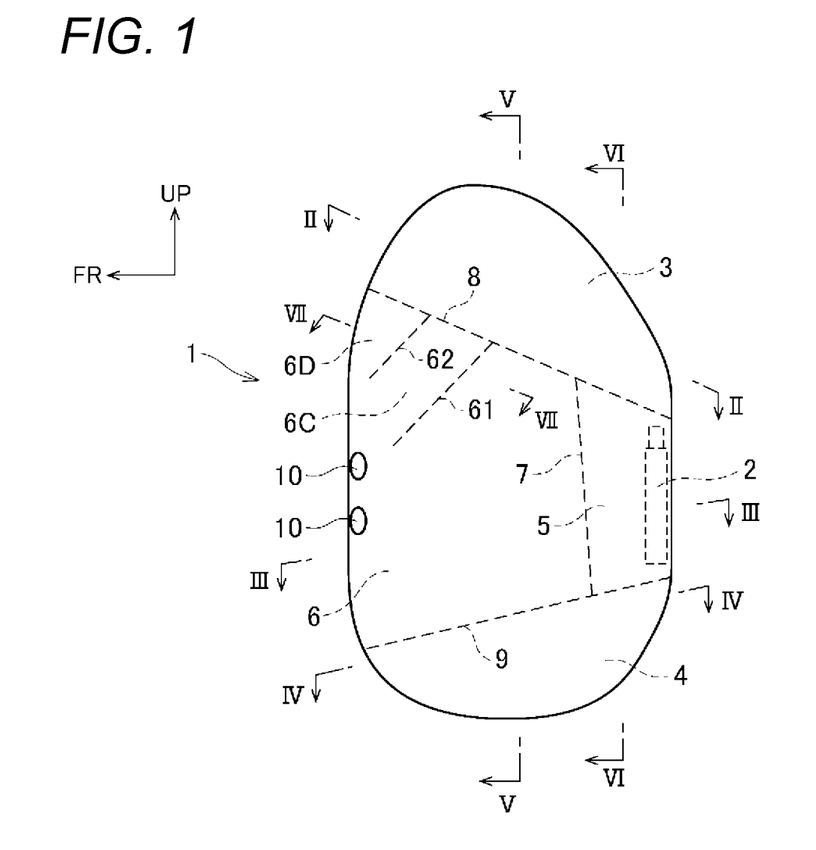
FIG. 1 is a side view of a side airbag according to an embodiment as viewed from an occupant side.
Figure 2:
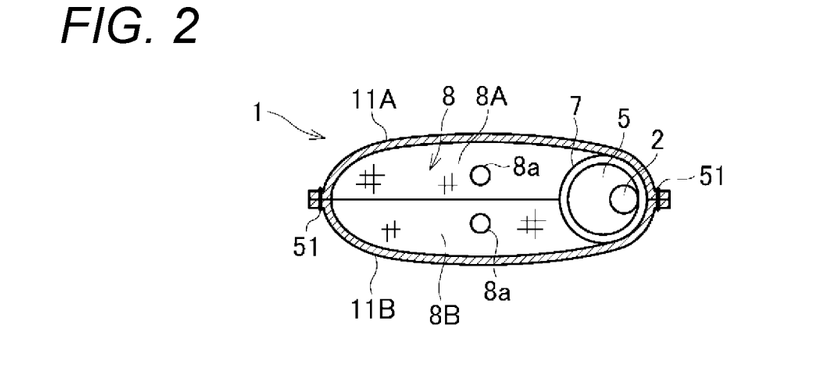
FIG. 2 is a cross-sectional view taken along a line II-II in FIG. 1.
Figure 3:
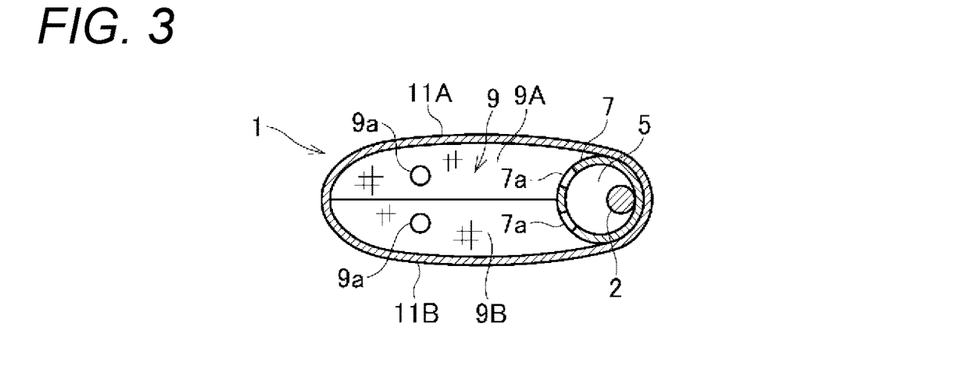
FIG. 3 is a schematic cross-sectional view taken along a line in FIG. 1.
Figure 4:
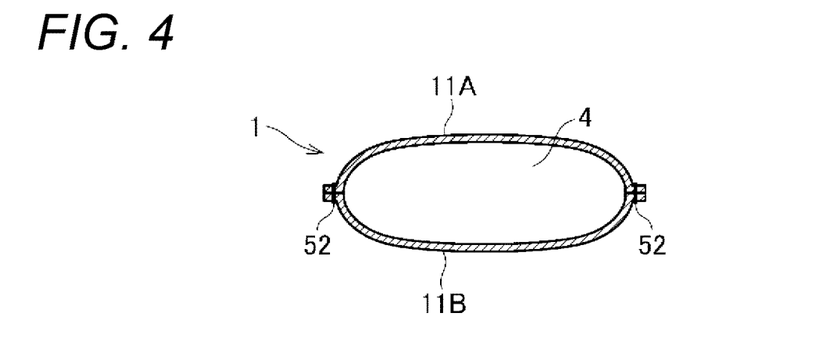
FIG. 4 is a schematic cross-sectional view taken along a line IV-IV in FIG. 1.
Figure 5:
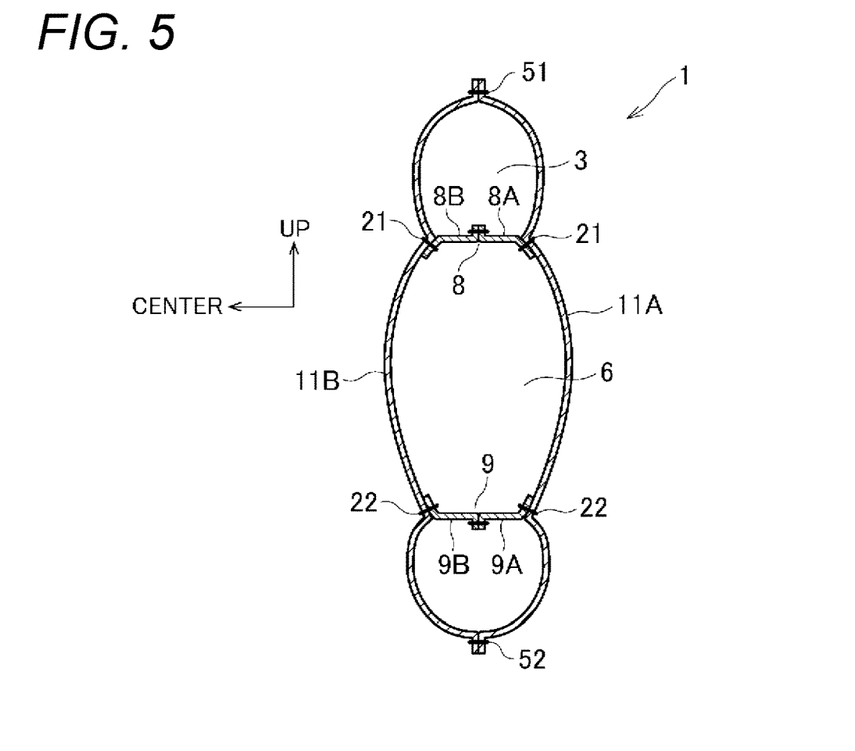
FIG. 5 is a schematic cross-sectional view taken along a line V-V in FIG. 1.
Figure 6:
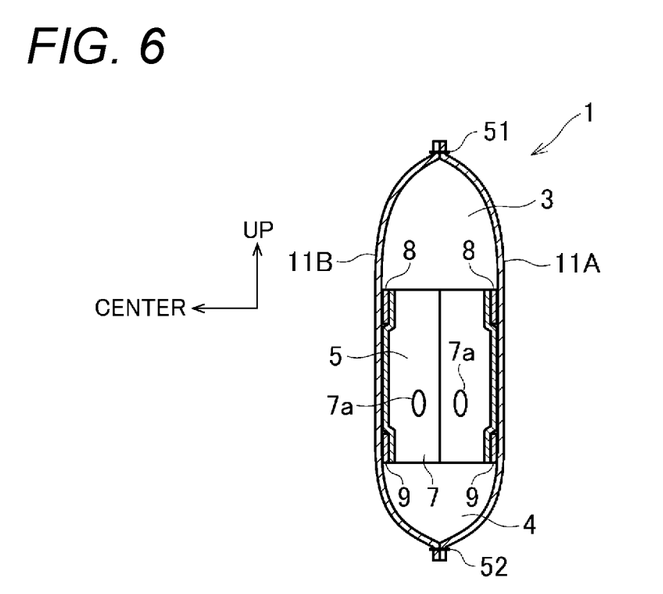
FIG. 6 is a schematic cross-sectional view taken along a line VI-VI in FIG. 1.
Figure 7:
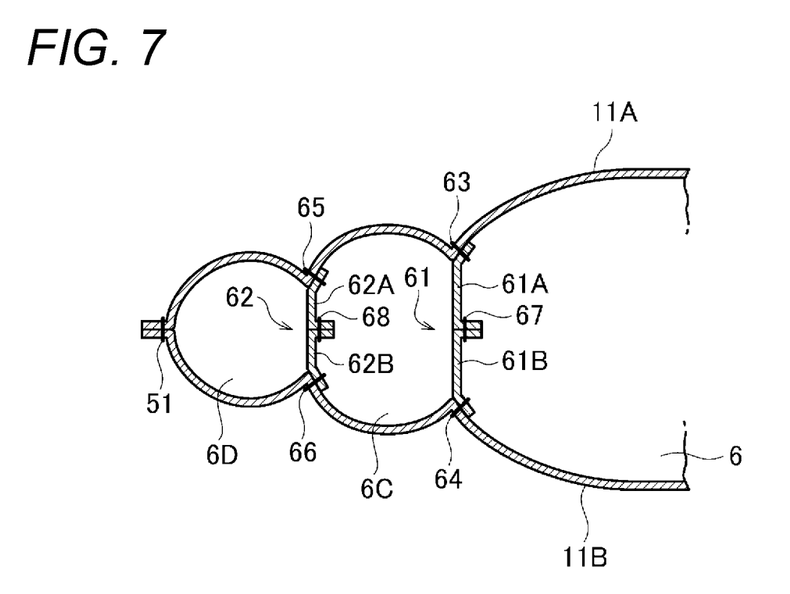
FIG. 7 is a cross-sectional view taken along a line VII-VII in FIGS. 1 and 14.

The airbag device includes the side airbag 1 that is folded and housed in the seatback, and an inflator 2 that supplies an inflation gas to the side airbag 1.

An inside of the side airbag 1 is divided into an upper chamber 3, a lower chamber 4, and a middle chamber 6 between the upper chamber 3 and the lower chamber 4 by partition panels 7, 8, and 9. An inflator installation chamber 5 is provided in a rear portion of the middle chamber 6.

In this embodiment, the upper chamber 3 is a first chamber, and the middle chamber 6 is a second chamber.

The upper chamber 3 is to be inflated and deployed to a side of a shoulder part of an occupant, and the lower chamber 4 is to be inflated and deployed to a side of a waist part of the occupant.

The middle chamber 6 is to be inflated and deployed to sides of a chest part and a belly part of the occupant.

The upper chamber 3 and the middle chamber 6 are separated from each other by the first partition panel 8. The first partition panel 8 is provided with an opening 8a through which the upper chamber 3 and the middle chamber 6 communicate with each other.

The lower chamber 4 and the middle chamber 6 are separated from each other by the second partition panel 9. The second partition panel 9 is provided with an opening 9a through which the lower chamber 4 and the middle chamber 6 communicate with each other.

Thickness regulating panels 61 and 62 serving as a thickness regulating member are provided at a front portion and an upper portion of the middle chamber 6, thereby forming regions 6C and 6D having small thicknesses.

The thickness regulating panels 61 and 62 extend downward toward a front side. The thickness regulating panel 62 is positioned on a front side and an upper side with respect to the thickness regulating panel 61.

The thickness regulating panel 61 on the rear side has a longer length in a longitudinal direction than the thickness regulating panel 62 on the front side.

The thickness regulating panel 61 on the rear side has a larger width in a thickness direction of the side airbag than the thickness regulating panel 62 on the front side.

The thickness regulating panel 61 is formed by sewing a right thickness regulating panel 61A and a left thickness regulating panel 61B together by a sewing thread 67. The thickness regulating panel 62 is formed by sewing a right thickness regulating panel 62A and a left thickness regulating panel 62B together by a sewing thread 68.

The thickness regulating panels 61 and 62 extend substantially in parallel to each other, and upper ends (rear ends) of the thickness regulating panels 61 and 62 are in contact with or close to the first partition panel 8. Lower ends (front ends) of the thickness regulating panels 61 and 62 are spaced apart from a front edge of the side airbag 1 by a predetermined distance.

The upper end of the thickness regulating panel 61 is positioned in the vicinity of the opening 8a, and a gas that passes through the opening 8a from the upper chamber 3 can flow to both the front side and a rear side of the thickness regulating panel 61. However, the opening 8a may be provided on a rear side of an illustrated position thereof.

The inflator installation chamber 5 is surrounded by the third partition panel 7. The partition panel 7 is a cylindrical gas distribution diffuser extending in the up-down direction, and has an upper end portion opened toward the upper chamber 3 and a lower end portion opened toward the lower chamber 4. An opening 7a is provided in a front portion of the third partition panel 7. The inflator installation chamber 5 and the middle chamber 6 communicate with each other through the opening 7a.

The inflator 2 is installed in the inflator installation chamber 5. In this embodiment, the inflator 2 has a cylindrical shape, and is installed with a longitudinal direction thereof coinciding with the up-down direction.

A vent hole 10 through which the gas flows out from the middle chamber 6 is provided in a front portion of the side airbag 1. In this embodiment, two vent holes are provided at an interval in the up-down direction. A front end of the thickness regulating panel 61 is close to the upper vent hole 10.

A configuration of a panel constituting the side airbag 1 will be described with reference to FIGS. 8 to 17.

Figure 8:
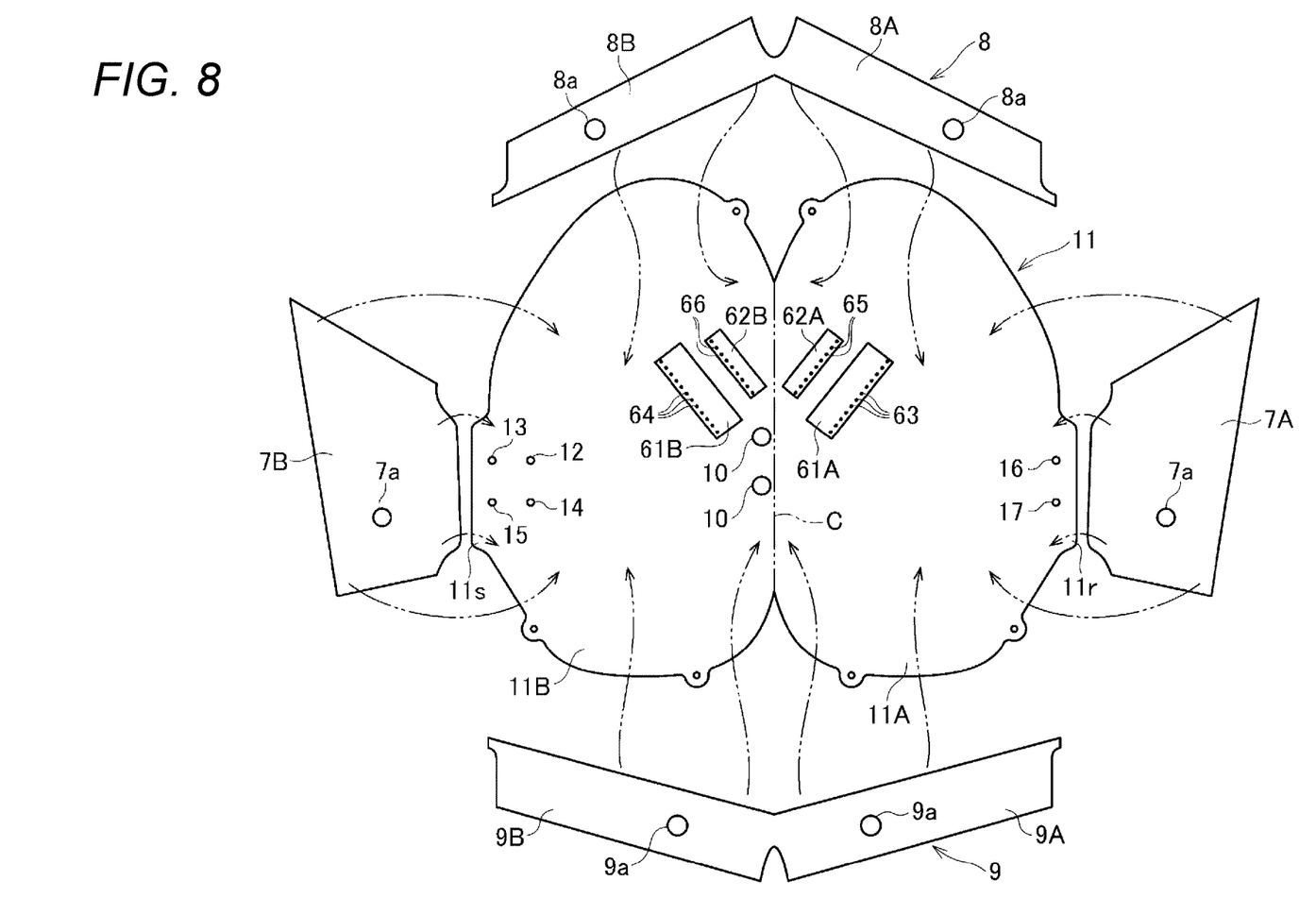
FIG. 8 is a panel configuration diagram of the side airbag.

An outer surface of the side airbag 1 is constituted by a main panel 11. As illustrated in FIG. 8, the main panel 11 includes a right main panel 11A constituting a right outer surface of the side airbag 1 and a left main panel 11B constituting a left outer surface of the side airbag 1. The right main panel 11A and the left main panel 11B are integrated in series, and the main panel 11 has a symmetrical shape with respect to a center line C. The vent hole 10 is provided in the vicinity of the center line C in the left main panel 11B.

Protruding portions 11r and 11s that protrude rearward of the side airbag 1 are provided at middle portions of a right edge of the right main panel 11A and a left edge of the left main panel 11B (rear edges of the side airbag 1) in the up-down direction.

Four small holes 12 to 15 for bolt insertion are provided at the left edge of the left main panel 11B. Two small holes 16 and 17 for bolt insertion are provided at the right edge of the right main panel 11A. The small holes 16 and 17 are provided at positions symmetrical to the small holes 13 and 15 with respect to the center line C.

Lower edges of the right thickness regulating panels 61A and 62A are sewn to the right main panel 11A by sewing threads 63 and 65 respectively. Lower edges of the left thickness regulating panels 61B and 62B are sewn to the left main panel 11B by sewing threads 64 and 66 respectively.

The right thickness regulating panels 61A and 62A and the left thickness regulating panels 61B and 62B are disposed such that the lower ends thereof are closer to the center line C. The right thickness regulating panels 61A and 62A and the left thickness regulating panels 61B and 62B are disposed symmetrically with respect to the center line C.

The first and second partition panels 8 and 9 include right partition panels 8A and 9A and left partition panels 8B and 9B, respectively. The right first partition panel 8A and the left first partition panel 8B are integrated in series, and are connected to each other at front portions thereof. Each of the right partition panel 8A and the left partition panel 8B has a width that gradually decreases from the front portion toward a rear portion. The right second partition panel 9A and the left second partition panel 9B are integrated in series, and are connected to each other at front portions thereof.

The third partition panel 7 is formed by sewing a right third partition panel 7A and a left third partition panel 7B together.

Figure 9:
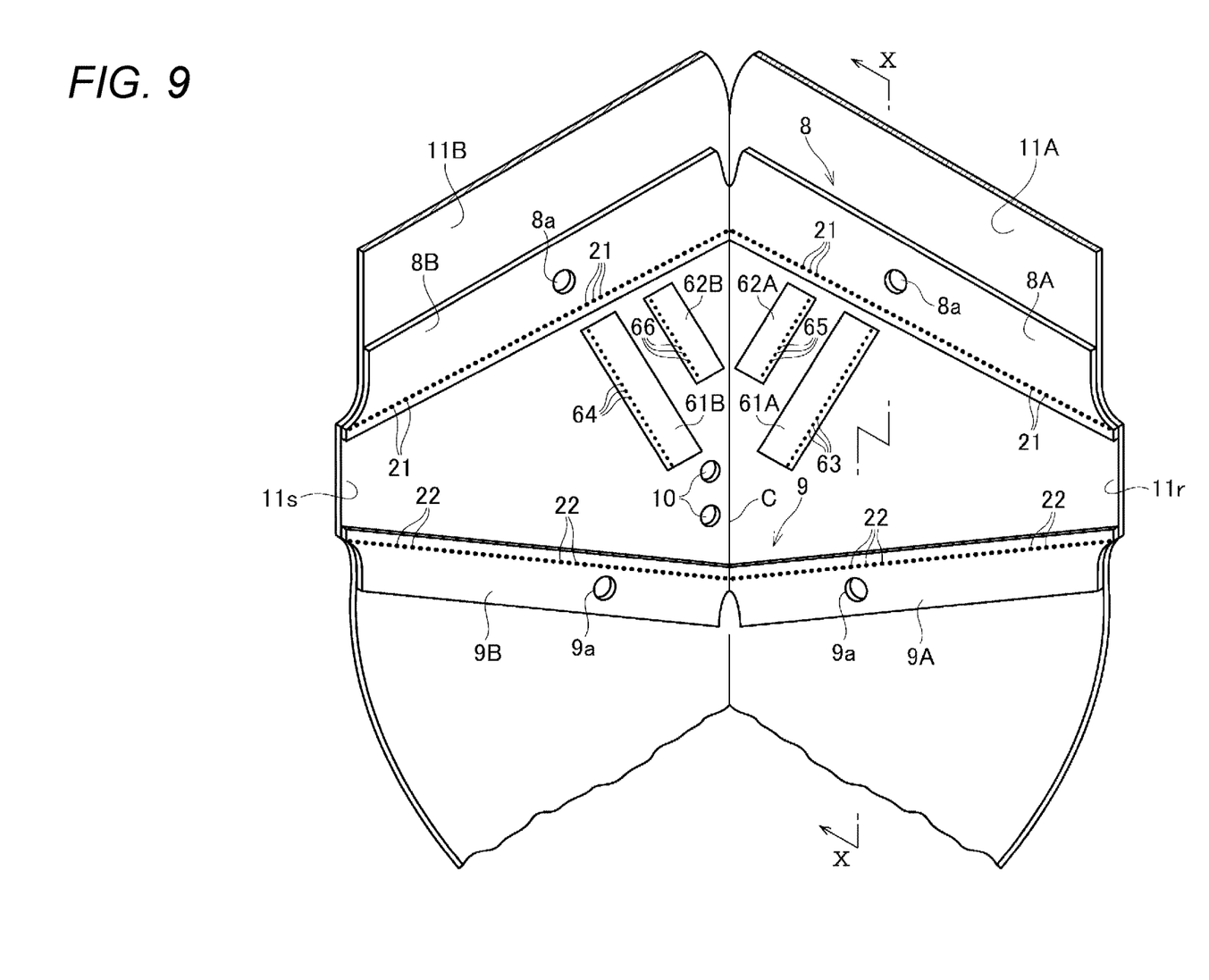
FIG. 9 is a perspective view showing a part of the side airbag in the course of sewing.
Figure 11:
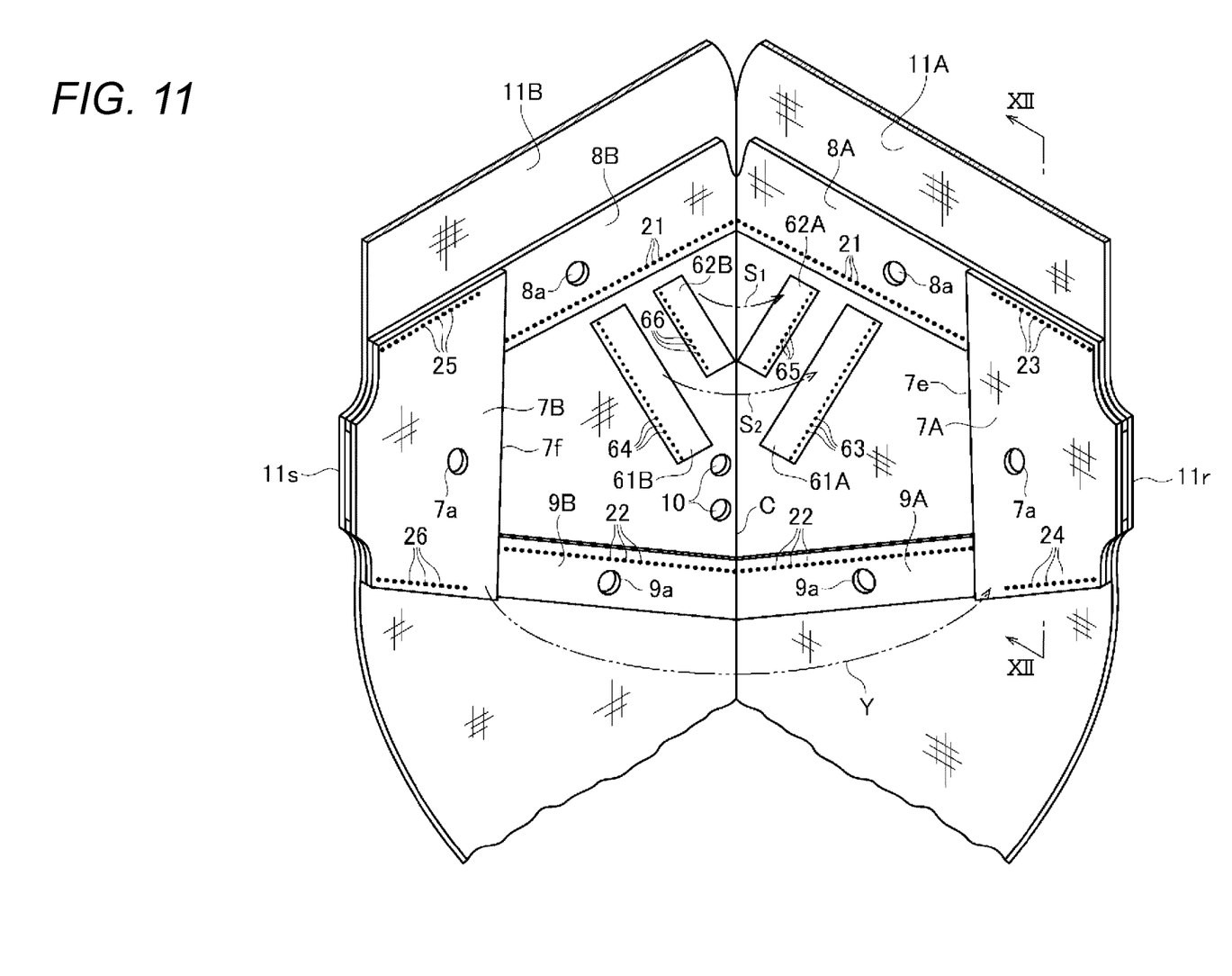
FIG. 11 is a perspective view showing a part of the side airbag in the course of sewing.

When sewing the side airbag 1, the right and left thickness regulating panels 61A, 61B, 62A, and 62B are sewn to the main panel 11 by the sewing threads 63 to 66. The partition panels 8 and 9 are disposed so as to overlap the main panel 11 in a manner of extending from a left end to a right end of the main panel 11, as illustrated in FIGS. 8 and 9. In FIGS. 9 and 11, the main panel 11 and the partition panels 8 and 9 are bent at a right angle along the center line C.

Figure 10:
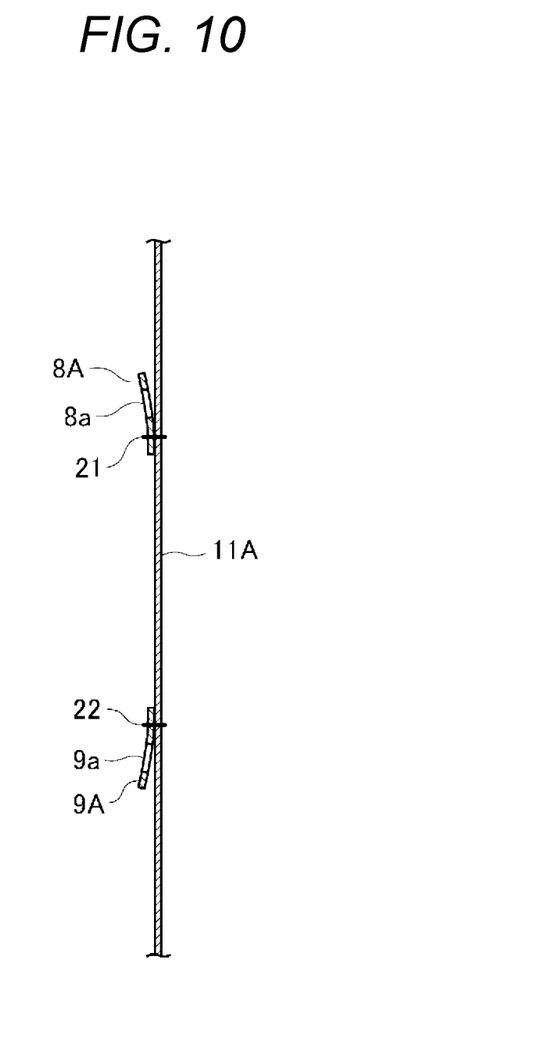
FIG. 10 is a cross-sectional view taken along a line X-X in FIG. 9.

As illustrated in FIGS. 9 and 10, a lower edge of the partition panel 8 is sewn to the main panel 11 by a sewing thread 21, and an upper edge of the partition panel 9 is sewn to the main panel 11 by a sewing thread 22.

Figure 12:
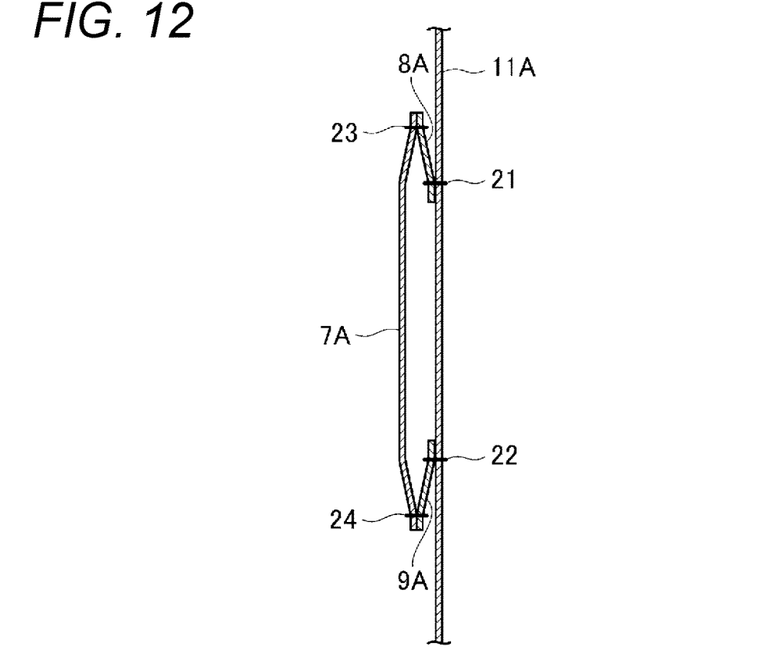
FIG. 12 is a cross-sectional view taken along a line XII-XII in FIG. 11.

After the thickness regulating panels 61A, 61B, 62A and 62B and the partition panels 8 and 9 are sewn to the main panel 11, the partition panels 7A and 7B are arranged, and the partition panels 7A and 7B are sewn to the partition panels 8 and 9 by sewing threads 23 to 26, as illustrated in FIGS. 11 and 12. The partition panel 7A extends from an upper edge of the partition panel 8A to a lower edge of the partition panel 9A along the right edge of the main panel 11A. The partition panel 7B extends from an upper edge of the partition panel 8B to a lower edge of the partition panel 9B along the left edge of the main panel 11B.

Upper edges of the partition panels 7A and 7B are sewn to the upper edges of the partition panels 8A and 8B by the sewing threads 23 and 25. Lower edges of the partition panels 7A and 7B are sewn to the lower edges of the partition panels 9A and 9B by the sewing threads 24 and 26. As illustrated in FIG. 12, the sewing threads 23 to 26 sew only the partition panels 7A and 7B to the partition panels 8 and 9. The sewing threads 23 to 26 do not sew the partition panels 7A, 7B, 8, and 9 to the main panel 11.

After the partition panels 7A and 7B are sewn to the partition panels 8 and 9 in this way, upper edges of the right and left thickness regulating panels 62A and 62B and upper edges of the thickness regulating panels 61A and 61B are sewn together by sewing threads 67 and 68 as indicated by arrows $S_1$ and $S_2$ in FIG. 11. Next, the main panel 11 is folded along the center line C as indicated by an arrow Yin FIG. 11. Thus, as illustrated in FIG. 13, the right and left partition panels 8A and 8B overlap each other, the right and left partition panels 9A and 9B overlap each other, and the right and left partition panels 7A and 7B overlap each other.

Figure 14:
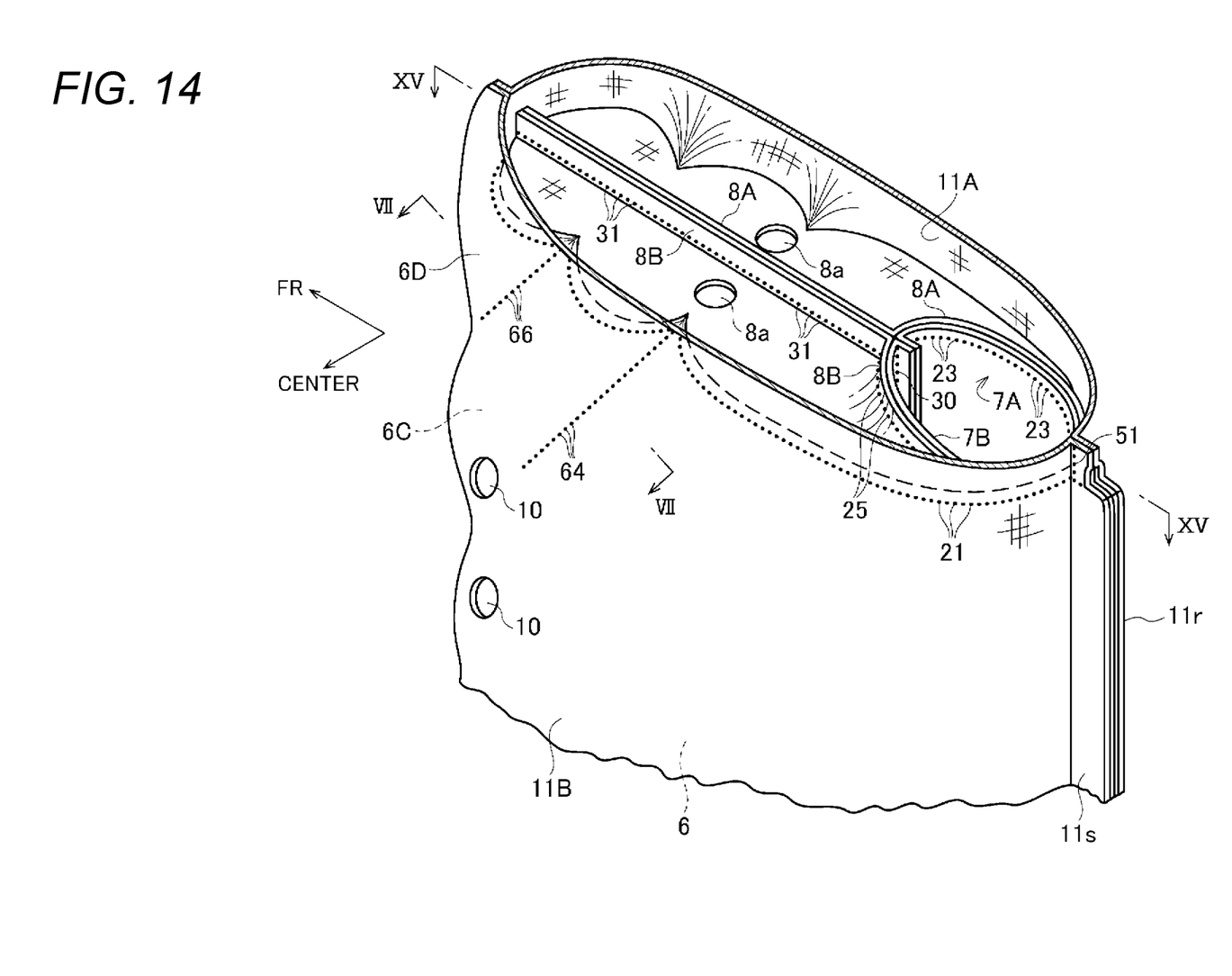
FIG. 14 is a cross-sectional perspective view of an inflated side airbag as taken along a line XIV-XIV in FIG. 13.
Figure 15:
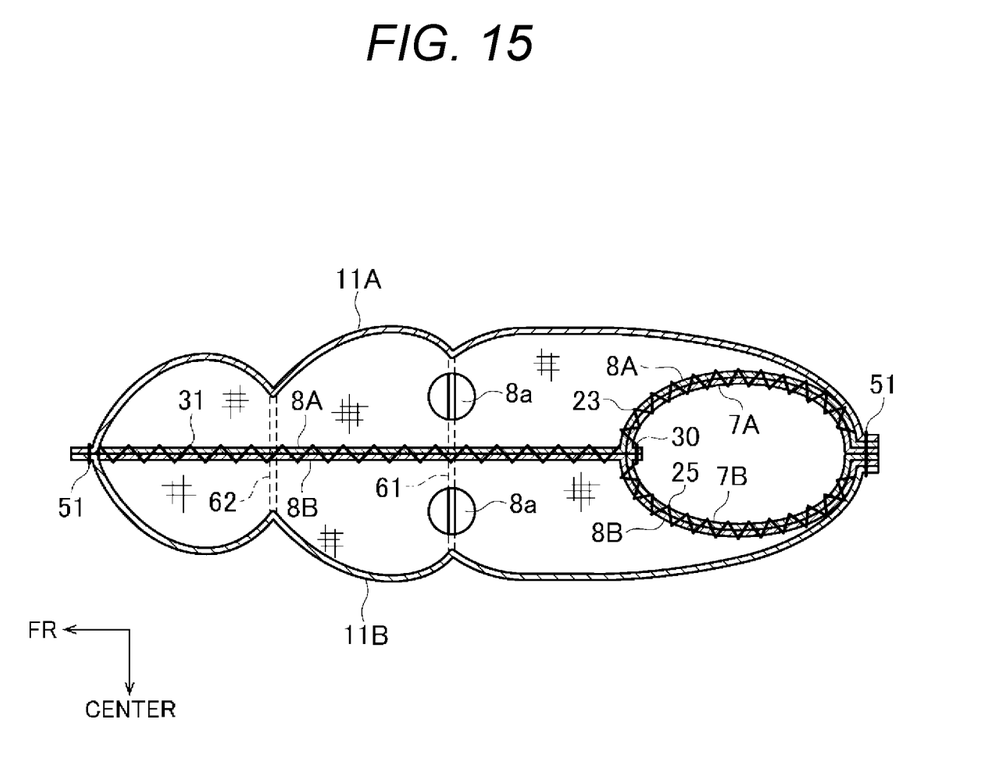
FIG. 15 is a cross-sectional view taken along a line XV-XV in FIG. 14.
Figure 16:
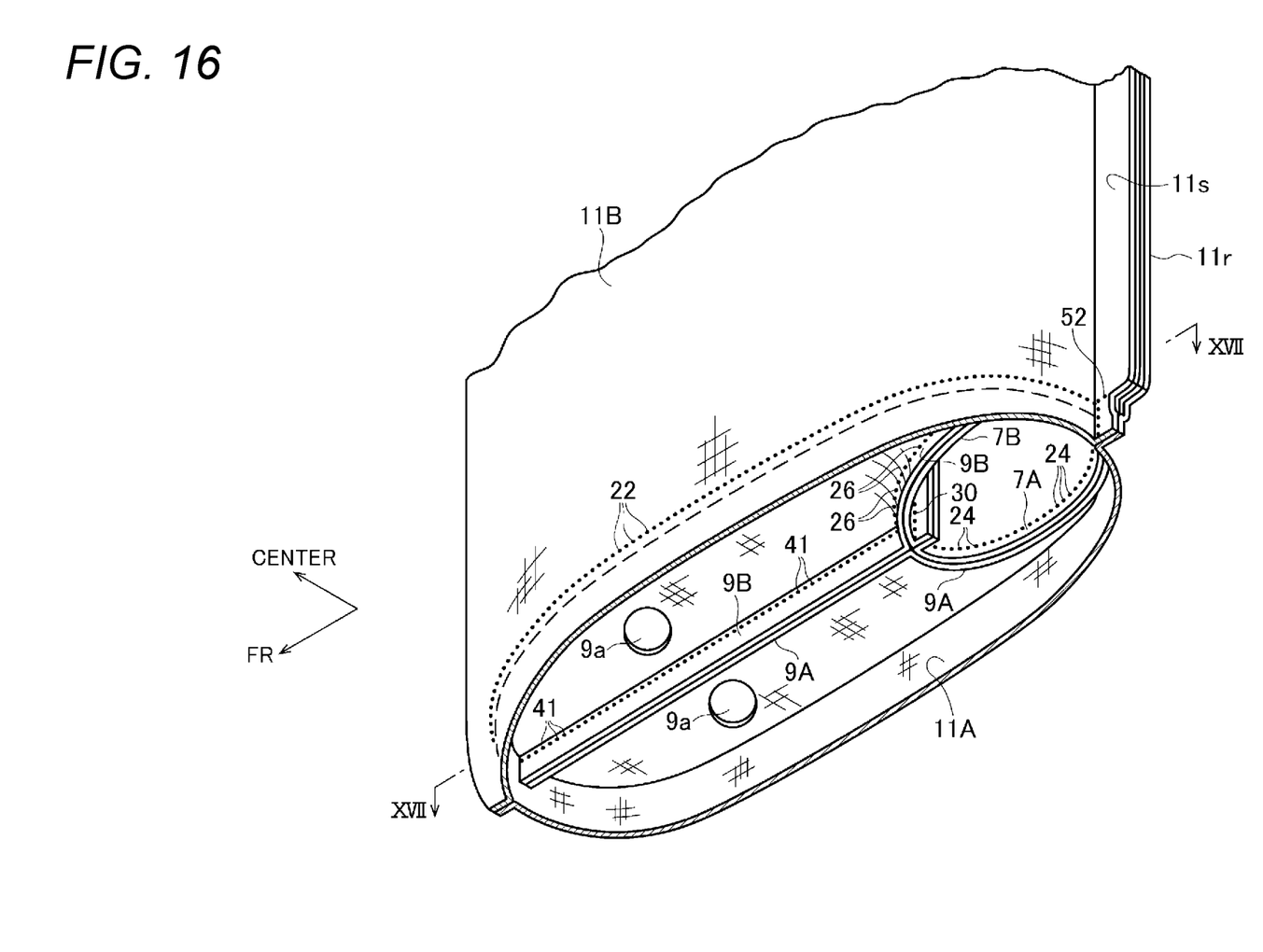
FIG. 16 is a cross-sectional view of the inflated side airbag as taken along a line XVI-XVI in FIG. 13.
Figure 17:
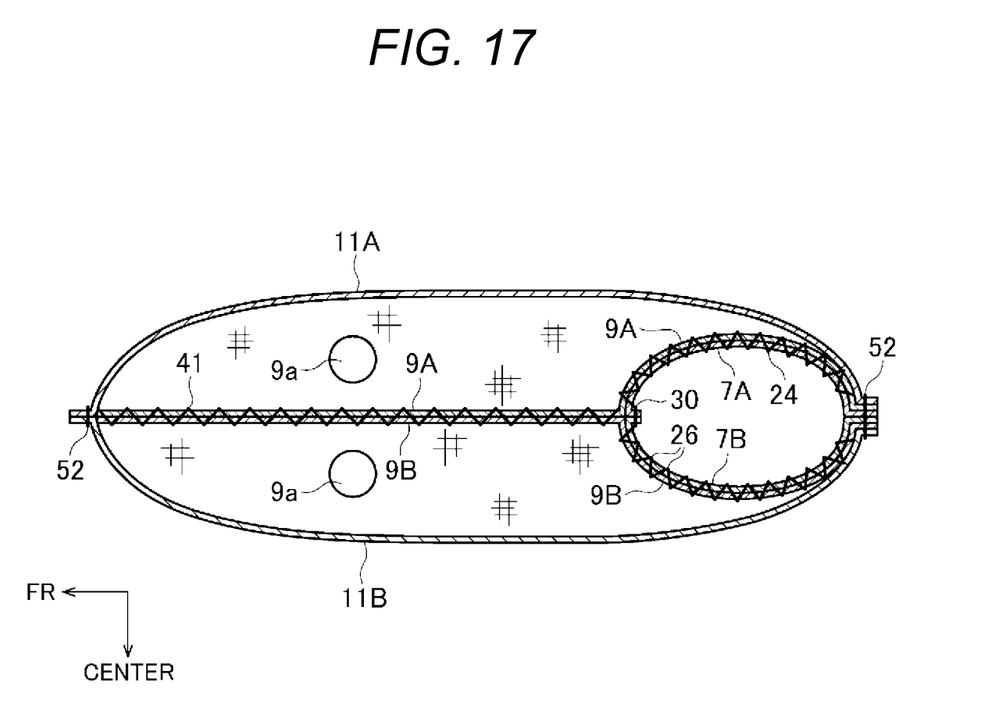
FIG. 17 is a cross-sectional perspective view taken along a line XVII-XVII in FIG. 15.

In this state, portions of the upper edges of the partition panels 8A and 8B on a front side of the partition panels 7A and 7B are sewn together by a sewing thread 31 (FIG. 14). In addition, portions of the lower edges of the partition panels 9A and 9B on a front side of the partition panels 7A and 7B are sewn together by a sewing thread 41 (FIG. 16). The sewing thread 31 is provided such that a rear end thereof extends to a position substantially overlapping front ends of the sewing threads 23 and 25, and the sewing thread 41 is provided such that a rear end thereof extend to a position substantially overlapping front ends of the sewing threads 24 and 26.

Further, front edges 7e and 7f (FIG. 11) of the partition panels 7A and 7B are sewn together by a sewing thread 30 (FIGS. 14 to 17).

Figure 13:
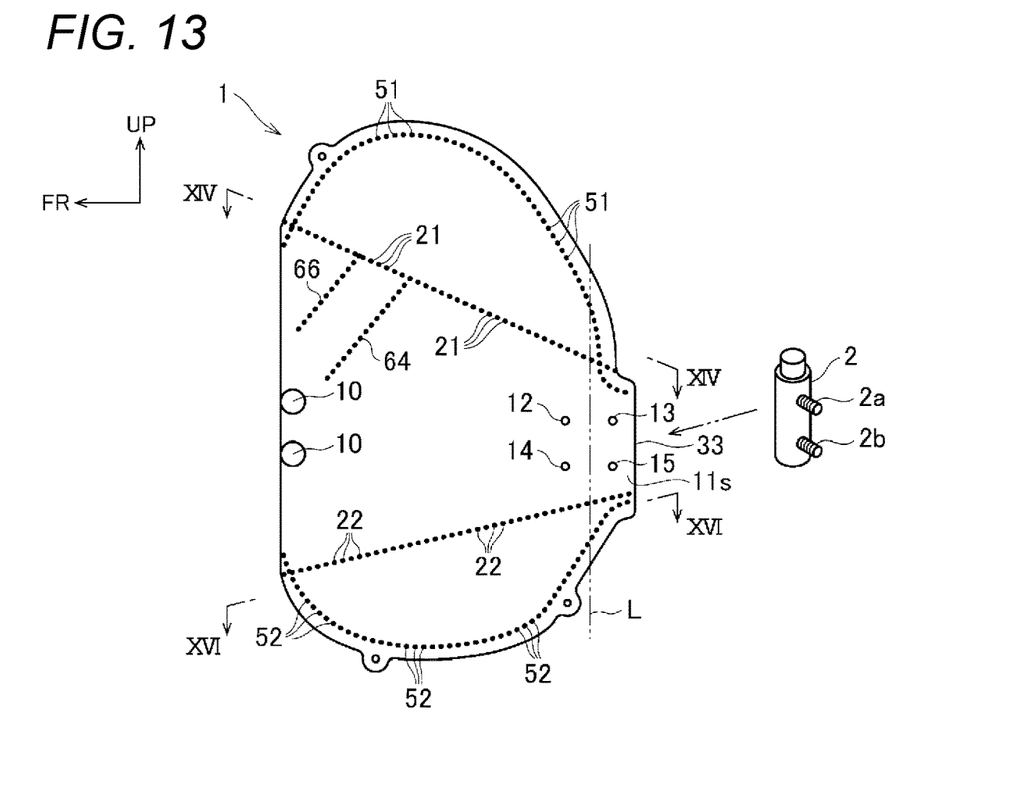
FIG. 13 is a side view of a sewn side airbag as viewed from the occupant side.

Thereafter, as illustrated in FIG. 13, outer peripheral edges of the main panels 11A and 11B, excluding the folding edge and the protruding portions 11r and 11s, are sewn together by sewing threads 51 and 52. The sewing thread 51 sews together upper outer peripheral edges of the main panels 11A and 11B, and the sewing thread 52 sews together lower outer peripheral edges of the main panels 11A and 11B. Note that the sewing threads 51 and 52 do not sew together the protruding portions 11r and 11s at rear edges of the main panels 11A and 11B. Accordingly, a loading/unloading opening 33 (FIG. 13) for the inflator 2 is formed between the protruding portions 11r and 11s.

After the outer peripheral edges of the right and left main panels 11A and 11B are sewn together by the sewing threads 51 and 52, the inflator 2 is inserted to between the partition panels 7A and 7B in the side airbag 1 through the loading/unloading opening 33. The inflator 2 is provided with two stud bolts 2a and 2b. The inflator 2 is inserted to between the partition panels 7A and 7B such that the stud bolt 2a is passed through the small hole 12 and the stud bolt 2b is passed through the small hole 14. Thereafter, the side airbag 1 is folded back by 180 degrees along a folding line L so that the stud bolt 2a is passed through the small holes 13 and 16 and the stud bolt 2b is passed through the small holes 15 and 17. The folding line L extends in the up-down direction through a center portion between the small holes 12 and 13 and a center portion between the small holes 14 and 15. By folding in the vicinity of the protruding portions 11r and 11s of the side airbag 1 along the folding line L in this manner, the loading/unloading opening 33 is hermetically closed.

The side airbag 1 is fixed to the seatback frame by the stud bolts 2a and 2b protruding out from the side airbag 1 through the small holes 12 to 17.

When the vehicle provided with the airbag device having the side airbag 1 configured as described above is subjected to a side collision from a right side, the inflator 2 is operated to generate a gas. The gas inflates the inflator installation chamber 5, and the gas flows in the up-down direction from the inflator installation chamber 5 to inflate the upper chamber 3 and the lower chamber 4. Thereafter, the gas flows into the middle chamber 6 from the upper chamber 3 and the lower chamber 4 through the openings 8a and 9a, and inflates the middle chamber 6. A part of the gas in the inflator installation chamber 5 flows into the middle chamber 6 through the opening 7a.

In the side airbag 1, the upper chamber 3 and the lower chamber 4 are inflated and deployed under a high internal pressure at an early stage, and restrain the shoulder part and the waist part of the occupant at an early stage. The middle chamber 6 is inflated and deployed later than the upper chamber 3 and the lower chamber 4, and an internal pressure of the middle chamber 6 is lower than that of the upper chamber 3 and the lower chamber 4 in an inflation completion state.

In addition, a thickness of an upper portion of the front portion of the middle chamber 6 is regulated by the thickness regulating panels 61 and 62. That is, an inflation thickness of a region 6C between the thickness regulating panels 61 and 62 (a thickness of a portion having a largest thickness. The same applies hereinafter) and an inflation thickness of a region 6D on a front side of the thickness regulating panel 62 are smaller than those of a rear side and a lower side of the thickness regulating panel 62. Therefore, an input load of the airbag applied to an upper arm part of the occupant is suppressed by the regions 6C and 6D. Note that the inflation thickness of the region 6D is smaller than the inflation thickness of the region 6C.

In the inflation completion state of the side airbag 1, the thickness regulating panel 61 is preferably along an upper arm part of a physically small occupant, and the thickness regulating panel 62 is preferably along an upper arm part of a physically large occupant.

In the side airbag 1, as illustrated in FIG. 14, an entire periphery of an upper edge portion of the partition panel 7 is sewn to the partition panel 8 (the right partition panel 8A and the left partition panel 8B) by the sewing threads 23 and 25, and the sewing thread 31 reaches the partition panel 7. Further, as illustrated in FIG. 16, an entire periphery of a lower edge portion of the partition panel 7 is sewn to the partition panel 9 (the right partition panel 9A and the left partition panel 9B) by the sewing threads 24 and 26, and the sewing thread 41 reaches the partition panel 7. There is no chamber existing between the inflator installation chamber 5 and the middle chamber 6. Therefore, the gas flowing from the inflator installation chamber 5 into the upper chamber 3 and the lower chamber 4 flows into the middle chamber 6 only through the openings 8a and 9a. As a result, the upper chamber 3 and the lower chamber 4 are rapidly inflated and deployed.

In this embodiment, the partition panel 8 extends obliquely upward toward the front side, the partition panel 9 extends obliquely downward toward the front side, and a distance between the partition panels 8 and 9 increases toward the front side of the side airbag 1. Accordingly, the upper chamber 3 is inflated and deployed obliquely upward from a rear end side toward the front side, and the lower chamber 4 is inflated and deployed obliquely downward from a rear end side toward the front side. Accordingly, the inflation and deployment of the chambers 3 and 4 are accelerated.

In this embodiment, since the widths of the right and left partition panels 8A and 8B decrease toward respective rear portion sides, a width of the partition panel 8 also decreases toward a rear portion side thereof. Therefore, over a region along the partition panel 8, an inflation thickness of the side airbag 1 decreases toward the rear portion side in an inflation completion state of the side airbag 1.

Although two thickness regulating panels 61 and 62 are provided in the above-described embodiment, one or three or more thickness regulating panels may be provided.

The above-described embodiment is just one embodiment of the present invention, and the present invention is not limited to the above-described embodiment. For example, in the present invention, the lower partition panel 9 may be omitted.

Although the present invention has been described in detail using a specific embodiment, it will be apparent to those skilled in the art that various changes can be made without departing from the spirit and the scope of the present invention.

REFERENCE SIGNS LIST 1 side airbag
2 inflator
3 upper chamber
4 lower chamber
5 inflator installation chamber
6 middle chamber
6C, 6D region having a small inflation thickness
7, 8, 9 partition panel
7a, 8a, 9a opening
10 vent hole
11 main panel
21 to 26, 30, 31, 41, 51, 52, 63 to 68 sewing thread
61, 62 thickness regulating panel

The invention claimed is:

1. A side airbag that is to be inflated and deployed to a side of an occupant, the side airbag comprising:
a first chamber that is positioned in an upper portion and is to be inflated to a side of a shoulder part of the occupant; and
a second chamber that is on a lower side of the first chamber,
wherein a thickness regulating member for reducing an inflation thickness is provided at an upper portion of a front portion of the second chamber,
wherein the thickness regulating member is constituted by a thickness regulating panel that extends downward toward a front side;
wherein a plurality of the thickness regulating panels are provided substantially in parallel,
wherein the thickness regulating panel on a rear side has a longer length in a longitudinal direction than the thickness regulating panel on a front side thereof, and, further comprising:
an upper chamber as the first chamber provided in the upper portion;
a lower chamber that is provided in a lower portion;
a middle chamber that is between the upper chamber and the lower chamber; and an inflator installation chamber that is positioned on a rear side in the middle chamber and communicates with the upper chamber and the lower chamber, respectively.

2. The side airbag according to claim 1,
wherein a front edge of the thickness regulating panel is separated from a front edge of the side airbag in an inflation completion state of the side airbag.

3. The side airbag according to claim 2,
wherein a vent hole is provided in the front portion of the second chamber,
wherein a front end of at least one of the thickness regulating panel is positioned in a vicinity of the vent hole.

4. The side airbag according to claim 1, comprising:
a first partition panel that partitions the upper chamber from the middle chamber;
a second partition panel that partitions the lower chamber from the middle chamber;
a first opening that is provided in the first partition panel and through which the upper chamber and the middle chamber communicate with each other; and
a second opening that is provided in the second partition panel and through which the lower chamber and the middle chamber communicate with each other.

5. The side airbag according to claim 4, further comprising:
a third partition panel that partitions the middle chamber from the inflator installation chamber,
wherein the first partition panel is joined to the third partition panel, and
wherein the second partition panel is joined to the third partition panel.

6. The side airbag according to claim 5,
wherein the first partition panel extends from a front edge to a rear edge of the side airbag,
wherein a rear portion of the first partition panel is sewn to an upper edge of the third partition panel,
wherein the second partition panel extends from a front edge to a rear edge of the side airbag, and
wherein a rear portion of the second partition panel is sewn to a lower edge of the third partition panel.

7. A side airbag device comprising:
the side airbag according to claim 1; and
an inflator that inflates the side airbag.

8. The side airbag according to claim 1,
wherein the thickness regulating panel on a rear side has a larger width in a thickness direction of the side airbag than the thickness regulating panel on a front side thereof.

9. The side airbag according to claim 1,
wherein a front edge of the thickness regulating panel is separated from a front edge of the side airbag in an inflation completion state of the side airbag.

10. A side airbag that is to be inflated and deployed to a side of an occupant, the side airbag comprising:
a first chamber that is positioned in an upper portion and is to be inflated to a side of a shoulder part of the occupant; and
a second chamber that is on a lower side of the first chamber,
wherein a thickness regulating member for reducing an inflation thickness is provided at an upper portion of a front portion of the second chamber,
wherein the thickness regulating member is constituted by a thickness regulating panel that extends downward toward a front side;
wherein a plurality of the thickness regulating panels are provided substantially in parallel,
wherein the thickness regulating panel on a rear side has a larger width in a thickness direction of the side airbag than the thickness regulating panel on a front side thereof and
further comprising:
an upper chamber as the first chamber provided in the upper portion;
a lower chamber that is provided in a lower portion;
a middle chamber that is between the upper chamber and the lower chamber; and
an inflator installation chamber that is positioned on a rear side in
the middle chamber and communicates with the upper chamber
and the lower chamber, respectively.

11. The side airbag according to claim 10,
wherein a front edge of the thickness regulating panel is separated from a front edge of the side airbag in an inflation completion state of the side airbag.

12. The side airbag according to claim 10,
wherein the thickness regulating panel on a rear side has a longer length in a longitudinal direction than the thickness regulating panel on a front side thereof.

* * * * *